United States Patent
Kudo et al.

(10) Patent No.: US 9,940,386 B2
(45) Date of Patent: Apr. 10, 2018

(54) DISTRIBUTED MODEL-BUILDING

(71) Applicant: Accenture Global Services Limited, Dublin (IE)

(72) Inventors: Takuya Kudo, Santiago del Estero (JP); Motoaki Hayashi, Santiago del Estero (JP); Kazuhito Nomura, Santiago del Estero (JP); Congwei Dang, Tokyo-to (JP)

(73) Assignee: Accenture Global Services Limited, Dublin (IE)

( * ) Notice: Subject to any disclaimer, the term of this patent is extended or adjusted under 35 U.S.C. 154(b) by 343 days.

(21) Appl. No.: 14/838,653

(22) Filed: Aug. 28, 2015

(65) Prior Publication Data
US 2017/0060988 A1 Mar. 2, 2017

(51) Int. Cl.
G06F 7/00 (2006.01)
G06F 17/30 (2006.01)

(52) U.S. Cl.
CPC .. G06F 17/30604 (2013.01); G06F 17/30569 (2013.01); G06F 17/30598 (2013.01)

(58) Field of Classification Search
None
See application file for complete search history.

(56) References Cited

U.S. PATENT DOCUMENTS

| 8,989,514 | B2* | 3/2015 | Russakoff | G06T 3/4053 382/128 |
| 2005/0120368 | A1* | 6/2005 | Goronzy | G06F 17/30787 725/28 |
| 2007/0265713 | A1 | 11/2007 | Veillette et al. | |
| 2008/0154821 | A1 | 6/2008 | Poulin | |
| 2011/0112998 | A1 | 5/2011 | Abe et al. | |
| 2012/0150764 | A1 | 6/2012 | Sadegh et al. | |

(Continued)

FOREIGN PATENT DOCUMENTS

| JP | 2015-1954 | 1/2015 |
| WO | WO 2014/130568 | 8/2014 |

OTHER PUBLICATIONS

International Search Report and Written Opinion for International Application No. PCT/JP2016/075918, dated Dec. 27, 2016, 8 pages.

Primary Examiner — Thu Nga Nguyen
(74) Attorney, Agent, or Firm — Fish & Richardson P.C.

(57) ABSTRACT

In some implementations, a computer-implemented method for generating computer-readable data models includes receiving time series data; applying a plurality of variable transformations to the time series data to generate a variable matrix with first and second dimensions; partitioning the variable matrix along a first one of the first and second dimensions to generate a plurality of data sets; partitioning the plurality of data sets along a second one of the first and second dimensions to generate a plurality data subsets; providing each of the plurality of data subsets to a respective computational unit in a distributed computing environment for evaluation; receiving, from the respective computational units, scores for a plurality of variables as determined by the respective computational units from the plurality of data subsets; and selecting a portion of the plurality of variables as having at least a threshold level of accuracy in modeling the time series data.

20 Claims, 11 Drawing Sheets

(56) References Cited

U.S. PATENT DOCUMENTS

| | | |
|---|---|---|
| 2014/0222998 A1 | 8/2014 | Vasseur et al. |
| 2014/0244836 A1 | 8/2014 | Goel et al. |
| 2014/0373054 A1* | 12/2014 | Edwards .............. H04N 21/458 |
| | | 725/37 |
| 2015/0019342 A1 | 1/2015 | Gupta et al. |
| 2015/0063349 A1 | 3/2015 | Ardalan et al. |
| 2015/0005903 A1 | 6/2015 | Worek et al. |
| 2016/0212007 A1* | 7/2016 | Alatorre .................. H04L 41/04 |

* cited by examiner

DISTRIBUTED MODEL-BUILDING

TECHNICAL FIELD

This document generally describes technology related to building data models in distributed computing environments, such as cloud-based computer systems.

BACKGROUND

Data models can represent relationships between information and can be used to analyze complex systems. For example, weather data models can represent weather patterns and can be used to determine likely future weather that will be experienced in various geographic areas. For instance, a weather data model can map detected weather information (e.g., current temperature, precipitation, pressure, dew point, wind speed, wind direction) at particular geographic locations to expected future weather that will be experienced at the same or different geographic locations. Such weather data models can be generated based on observed weather conditions over time at various geographic locations and using, for example, domain knowledge (expertise) about relationships between weather conditions in various geographic locations.

Distributed computing environments, such as cloud computer systems, allow for operations to be performed across multiple computers working in parallel. Each computational unit in a distributed environment, which may or may not be based on physical computational units (e.g., processors, computers, servers), can be managed by a centralized process and can operate independently of the other computing units. For example, a cloud computer system can distribute the processing of multiple different data sets across multiple computational units of the cloud computer system, which can each process their corresponding data set in parallel without interacting with the other computational units.

SUMMARY

This document generally describes computer systems, techniques, and program products for generating data models in distributed computing environments without domain knowledge and based on large data sets. For example, time series data records, such as data records generated by internet of things (IoT) devices (e.g., networked sensors), can be used to generate data sets that are processed by different computational units, which can each identify significant variables from the data sets that they are processing. The significant variables identified by each of the computational units can be merged to identify significant variable across the full spectrum of time series data.

In some implementations, a computer-implemented method for generating computer-readable data models includes receiving, at a computer system, time series data from a data source, wherein the time series data comprises a plurality of data records; applying, by the computer system, a plurality of variable transformations to the time series data to generate a variable matrix with a first dimension and a second dimension, wherein the first dimension includes a plurality of variables that correspond to the plurality of variable transformations, and the second dimension includes a plurality of data instances that correspond to the plurality of data records; partitioning, by the computer system, the variable matrix along a first one of the first and second dimensions to generate a plurality of data sets; partitioning, by the computer system, the plurality of data sets along a second one of the first and second dimensions to generate a plurality data subsets, wherein each of the plurality of data subsets includes multiple variables from the plurality of variables and multiple data instances from the plurality of data instances; providing, by the computer system, each of the plurality of data subsets to a respective computational unit in a distributed computing environment for evaluation of a level of importance for the multiple variables included in each of the plurality of data subsets based on the multiple data instances in each of the plurality of data subsets; receiving, at the computer system and from the respective computational units, scores for the plurality of variables as determined by the respective computational units from the plurality of data subsets; and selecting, by the computer system, a portion of the plurality of variables as having at least a threshold level of accuracy in modeling the time series data from the data source.

Such a method can optionally include one or more of the following features. Partitioning the variable matrix along the first one of the first and second dimensions can include partitioning the variable matrix along the second dimension so that each of the plurality of data sets includes data values for a portion of the plurality of data instances across all of the plurality of variables. Partitioning the plurality of data sets along the second one of the first and second dimensions can include partitioning the plurality of data sets along the first dimension so that each of the plurality of data subsets includes data values for a portion of the plurality of data instances across a portion of the plurality of variables. At least a portion of the plurality of data instances can be redundant across the plurality of data sets and the plurality of data subsets. At least a portion of the plurality of variables can be redundant across the plurality of data subsets. Partitioning the variable matrix along the second dimension can include randomly ordering the data instances and their corresponding data values in the variable matrix; and assigning groups of adjacent data instances into the plurality of data sets, with the groups of adjacent data instances overlapping each other. Partitioning the plurality of data sets along the first dimension can include randomly selecting groups of variables from the plurality of variables; and identifying, for each of the groups of variables, other variables upon which values for the selected groups of variables are, at least partially, based. The plurality of variables can have associated weights that indicate how accurately they model the time series data. The groups of variable can be randomly selected based, at least partially, on the associated weights.

Each of the respective computational units can be programmed to evaluate the level of importance for the multiple variables by: determining importance scores for each of the multiple variables that are based on a change in accuracy in modeling the time series data between when each of the multiple variables are present in and absent from the plurality of data subsets; determining correlation scores for each of the multiple variables that indicate levels of correlation with a target variable; and determining the scores for the plurality of variables based on combinations of the importance scores and the correlation scores. The importance scores can be determined based on decision trees that are randomly constructed from each of the plurality of data subsets.

Such a method can further include generating, using a plurality of modeling algorithms, a plurality of data models based, at least in part, on the selected portion of the plurality of variables; comparing levels of accuracy for the plurality of data models in modeling the time series data from the data source; and selecting a best data model from among the plurality of data models based, at least in part, on the comparison of the levels of accuracy for the data models. The plurality of variable transformations can include a plurality of statistical transformations, a plurality of time domain transformations, a plurality of frequency domain transformations, a plurality of shape domain transformations, or combinations thereof. The data source can be an internet of things (IoT) sensor and the time series data comprises IoT data generated by the IoT sensor. The portion of the plurality of variables can be generated without domain knowledge related to the time series data or the data source. The distributed computing environment can be a cloud computing system, and the respective computational units can be nodes in the cloud computing system.

In another implementation, a computer system for generating data models includes an interface that is programmed to receive time series data from a data source, wherein the time series data comprises a plurality of data records; and a model building engine that is programmed to: apply a plurality of variable transformations to the time series data to generate a variable matrix with a first dimension and a second dimension, wherein the first dimension includes a plurality of variables that correspond to the plurality of variable transformations, and the second dimension includes a plurality of data instances that correspond to the plurality of data records, partition the variable matrix along a first one of the first and second dimensions to generate a plurality of data sets, partition the plurality of data sets along a second one of the first and second dimensions to generate a plurality data subsets, wherein each of the plurality of data subsets includes multiple variables from the plurality of variables and multiple data instances from the plurality of data instances, provide each of the plurality of data subsets to a respective computational unit in a distributed computing environment for evaluation of a level of importance for the multiple variables included in each of the plurality of data subsets based on the multiple data instances in each of the plurality of data subsets, receive, from the respective computational units, scores for the plurality of variables as determined by the computational units from the plurality of data subsets, and select a portion of the plurality of variables as having at least a threshold level of accuracy in modeling the time series data from the data source.

Such a computer system can optionally include one or more of the following features. Partitioning the variable matrix along the first one of the first and second dimensions can include partitioning the variable matrix along the second dimension so that each of the plurality of data sets includes data values for a portion of the plurality of data instances across all of the plurality of variables. Partitioning the plurality of data sets along the second one of the first and second dimensions can include partitioning the plurality of data sets along the first dimension so that each of the plurality of data subsets includes data values for a portion of the plurality of data instances across a portion of the plurality of variables. At least a portion of the plurality of data instances can be redundant across the plurality of data sets and the plurality of data subsets. At least a portion of the plurality of variables can be redundant across the plurality of data subsets.

Such a computer system can further include a cloud computing system comprising a plurality of nodes, wherein the respective computational units are the plurality of nodes and each of the plurality of nodes is programmed to evaluate the level of importance for the multiple variables by: determine importance scores for each of the multiple variables that are based on a change in accuracy in modeling the time series data between when each of the multiple variables are present in and absent from the plurality of data subsets; determine correlation scores for each of the multiple variables that indicate levels of correlation with a target variable; and determine the scores for the plurality of variables based on combinations of the importance scores and the correlation scores.

Certain implementations may provide one or more advantages. For example, data models can be generated without previous domain knowledge regarding the field or area in which the data models are being generated. For instance, instead of needing some preexisting information regarding the connections and associations between variables, which may not always be possible to readily and/or accurately obtain, data models can be generated without any prior information about the thing/system/device that is being modeled.

In another example, comprehensive variable transformations can be used to ensure that important variables can be identified for model building, especially in the context of IoT data, which is large both in terms of volume, variety, and velocity. Furthermore, parallel distributed processing techniques used for model building can allow for such a large set of diverse data to be used efficiently for variable identification and model building. This can improve the efficiency with which computer resources (e.g., processor cycles, memory) are used to generate data models from such large data sets. In a further example, using composite scores based on variable importance scores and correlation scores can allow for correlations between variables, including non-linear correlations, to be readily identified.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document generally describes techniques, systems, program products, and computing devices for generating data models in distributed computing environments, such as cloud computing systems. Data records can be separated out into smaller subsets, which can include overlapping portions of data, which can be processed by separate computational units to identify significant variables and variable associations. Such information can be combined to identify significant variables and/or variable associations.

A variety of techniques can be used to generate the smaller subsets. For example, data records can initially be expanded through multiple different data transformations, which can generate multiple transformed data records for each record. Next, the transformed data records can be parallelized horizontally and/or vertically. Horizontal data parallelization includes grouping data records together so that some time sequential time series data records are separated into different subsets. Vertical data parallelization includes grouping data records together so that transformations of the same data record are split into different subsets. Such data parallelization can be performed so that there are some overlapping portions of data across subsets.

A variety of techniques can be used to identify significant variables from different data subsets. For example, one or more machine learning techniques can be used to identify significant variables, such as regression analysis, classifications, decision trees, and/or other machine learning algorithms. Variables can be assigned scores indicating their level of significance. Such scores can be evaluated against each other to identify the most significant variables within each subset, and across all of the subsets to identify the most significant variables to be included in a data model.

Figure 1:
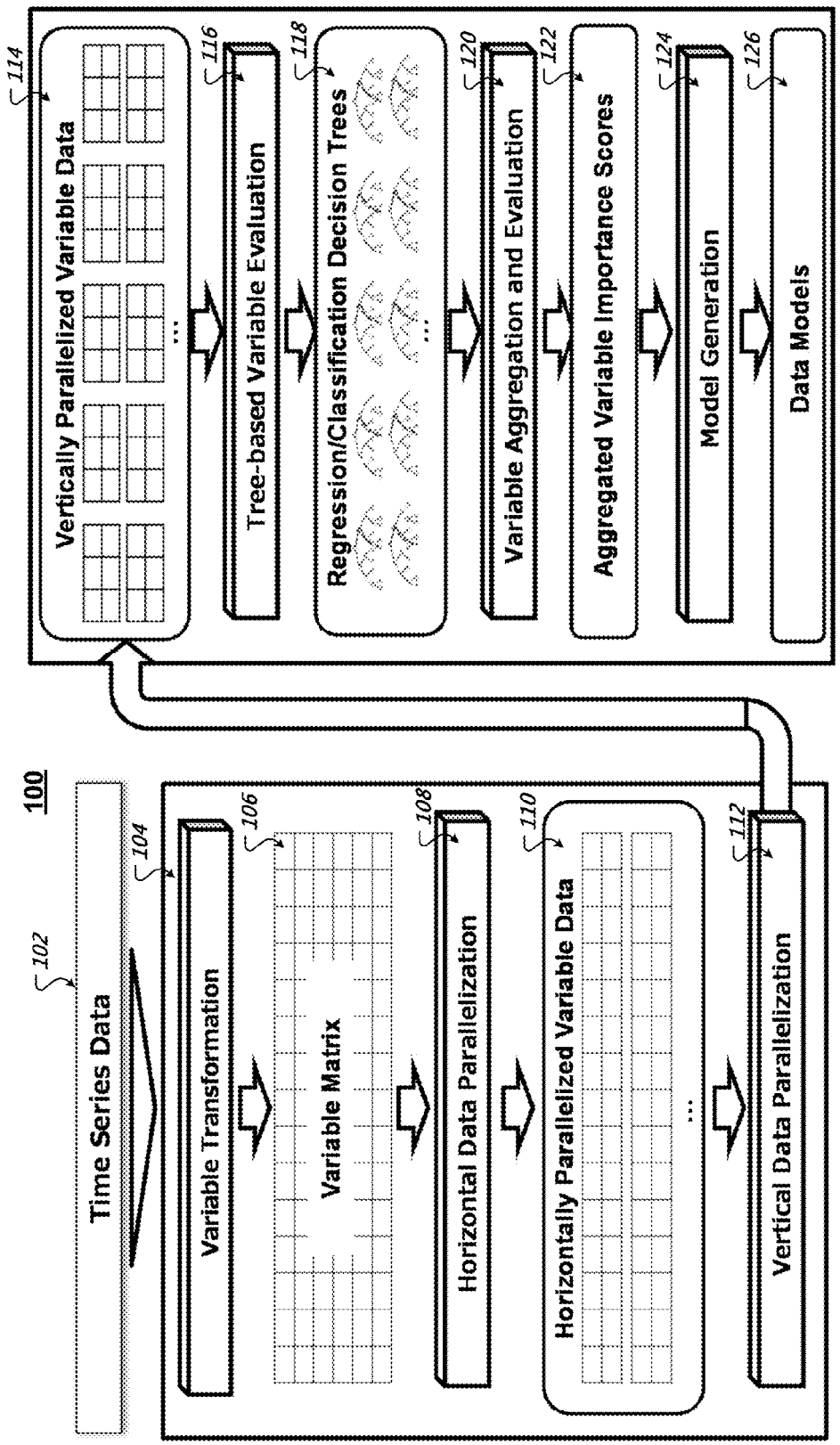
FIG. 1 is a conceptual diagram of an example system for generating data models in a distributed computing environment.

FIG. 1 is a conceptual diagram of an example system 100 for generating data models in a distributed computing environment. The example system 100 can be implemented across one or more computing devices, such as on a cloud computing system, networked computing devices, and/or single computing devices that may have multiple actual and/or virtual computing units (e.g., processors, operating systems, process threads, virtual machines). FIGS. 2A-F provide illustrative examples of different portions of the example system 100, which are described in-line with the discussion of FIG. 1.

The system 100 can generate data models from a variety of different types of data, such as time series data 102. The time series data 102 can include a sequence of data points or data records for a data source over time, such as successive measurements taken by a sensor at various intervals over a period of time. Data sources can include any of a variety of appropriate devices, sensors, systems, components, and/or other appropriate systems that are capable of and configured to generate data records, such as time series data. For example, the time series data 102 can be generated by IoT devices, such as sensors, components, and devices that are able to measure one or more aspects of their or the surrounding environment's current state and to communicate (wired and/or wirelessly) those measurements as data over the internet (and/or other communication networks, such as local area networks (LANs), wide area networks (WANs), virtual private networks (VPNs), wireless networks (e.g., Wi-Fi networks, BLUETOOTH networks, mobile data networks), or any combination thereof).

For example, the time series data 102 can be measurements that are taken by engine sensors that take measurements related to the operation and performance of various components of an engine, such as measurements of the temperature, rate of rotation, pressure, flow rate, receipt of control signals, transmission of control signals, and/or other appropriate measurements. Such example time series data can be used, for example, to generate data models for an engine, which can be used to prospectively identify and correct issues with the engine before they occur (e.g., identify indicators that belts are wearing and in need of replacement) and/or to reactively determine which component(s) of an engine caused a malfunction (e.g., which components are causing vibrations at low speeds).

Multiple variable transformations 104 can be performed on the time series data 102 to generate a variable matrix 106 that includes the transformed data (data records transformed into multiple variable spaces by multiple variable transformations). The variable transformations 104 can include number of different types of transformations, such as statistical transformations that can transform the data records into statistical variable spaces, time domain transformations that can transform the data records into time domain variable spaces, frequency domain transformations that can transform the data records into frequency domain variable spaces, and/or shape domain transformations that can transform the data records into shape domain variable spaces. Multiple different transformations of each type can be performed on the time series data 102. The system 100 can use a large set of variable transformations 104, which can allow for a large collection of variables to be considered when constructing and/or refining a data model from the time series data 102. This is instead of relying on domain knowledge (e.g., knowledge about engine sensors on the relationships between sensor readings and engine conditions) to be used to preselect a subset of these variables that are likely to be relevant for the specific time series data 102 that is being evaluated.

Figure 2A:
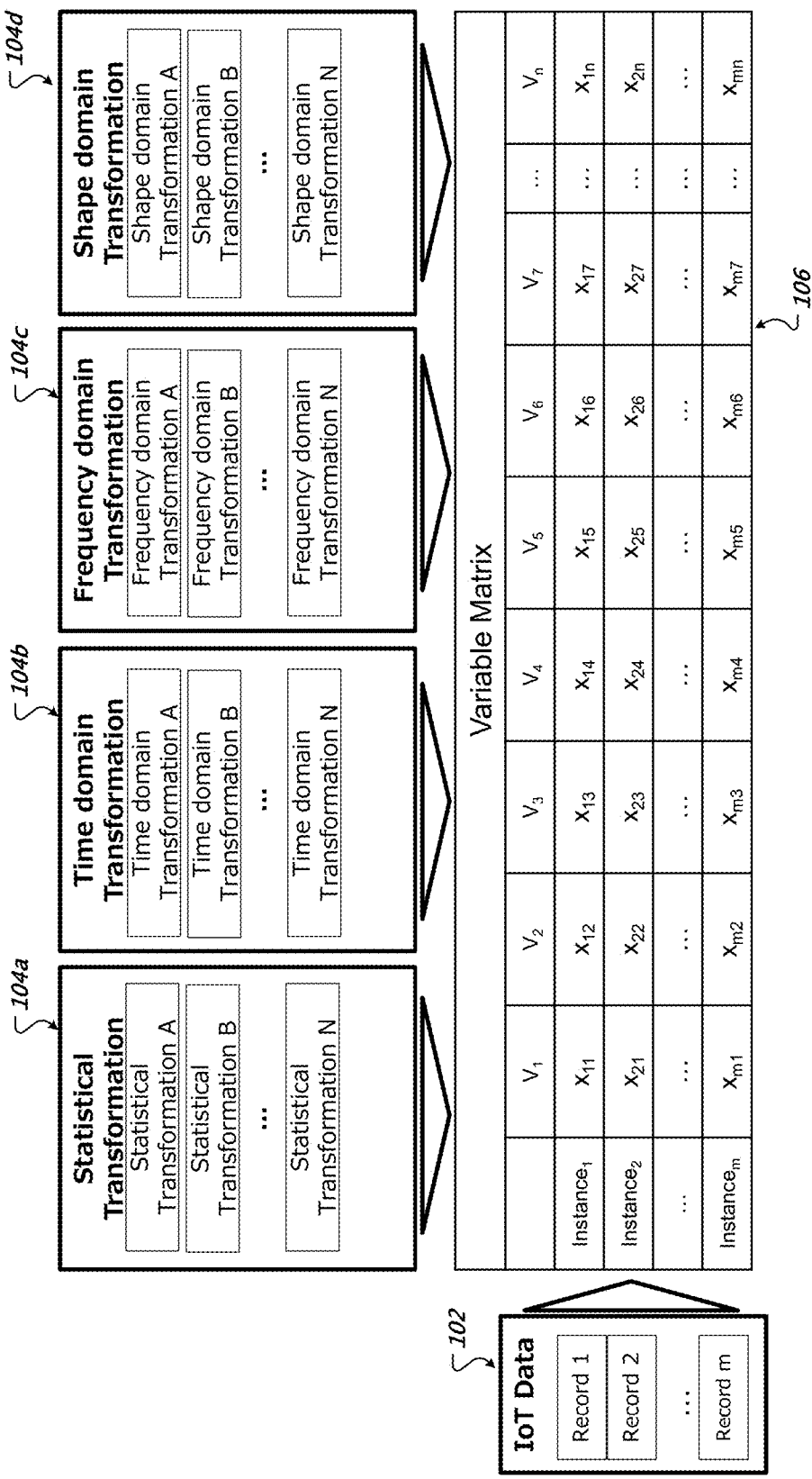
FIGS. 2A-F provide illustrative examples of different portions of the example system described in FIG. 1.

Referring to FIG. 2A, the time series data 102 is depicted in this example as being IoT data that include data record 1-$m$. Multiple example types of data transformations 104$a$-$c$ are depicted as each including multiple different transformations (e.g., statistical transformations A-N, time domain transformations A-N, frequency domain transformations A-N, shape domain transformations A-N) that are applied to the data 102 to generate the variable matrix 106. The example variable matrix 106 that is depicted includes variables $V_1$-$V_n$, which can each correspond to one of the variable transformations 104 that are applied to the data 102, with data values $x_{11}$-$x_{mn}$ across instance$_1$-instance$_m$, which each correspond to one of the data records 102. For example, the data values $x_{11}$-$x_{m1}$ are generated for the variable $V_1$ by applying the one of the variable transformations 104 that corresponds to $V_1$ to each of the data records 1-$m$. This can be performed for each of the variable transformations 104, which can result in the number of data values that are to be considered for data model generation being multiplied by a factor that is the same as or similar to the number of variable transformations 104 that are applied to the data records 102. For instance, with m data records and n transformations and corresponding transformed variables, the number of data values in the matrix 106 is equal to m*n. This can additionally be multiplied by the number of data sources. For instance, if there are p data sources (e.g., sensors) that each produce m data records, the size of the matrix 106 can expand to the product m*n*p.

Time series data, such as data that can be generated by IoT devices, can present particular challenges based on potentially valuable information being contained in the sequence of data records 102 and their changing values over time. The system 100 can apply transformations that treat the data records 102 as time series type data and can perform arithmetic operations to the data records 102 to derive indirect time series variables to further reduce the risk of losing time series data, which can be beneficial when the variable matrix 106 is partitioned into subsets for evaluation across multiple computational units.

Any of a variety of different types of variables and variable transformations can be included in the variable matrix 106, such as the example types of transformations 104$a$-$c$ that are depicted in FIG. 2A. Tables 1-4 below provide illustrative examples of the different variable transformations that can be included within each of the types of transformations 104a-c that are used as part of the system 100. Table 1 below depicts examples of statistical transformations 104a. Other statistical transformations can also be used.

TABLE 1

| Transformation Name | Description/Formula | Number of Variables |
|---|---|---|
| Basic Statistics | Mean, Variance, Min, Max | 4 |
| 4-quantile (or Quartile) | Values on percentage boundaries of [<=25%, <=50%, <=75%] | 3 |
| 10-quantile | Values on percentage boundaries of [<=10%, <=20%, . . . , <=90%] | 9 |
| Normal Distribution Approximation | Regard the distribution as Normal and compute the parameters (mu, sigma) | 2 |
| Beta Distribution Approximation | Regard the distribution as Beta and compute the parameters (alpha, beta) | 2 |
| 2nd, 3rd moment of probability | sum[$x^2$ * f(i)], sum[$x^3$ * f(i)] | 2 |
| Basic Statistics of 1st differential | Mean, Variance, Min, Max of 1st differential | 4 |

Table 2 below depicts examples of time domain transformations 104b. Other time domain transformations can also be used.

TABLE 2

| Transformation Name | Description/Formula | Number of Variables |
|---|---|---|
| Autoregressive Model of Degree 3 (AR(3)) | Fit the AR(3) model via formula: y(t) = c + φ1y(t − 1) + φ2y(t − 2) + φ2y(t − 3) | 4 |
| Autoregressive-Moving-Average Model of Degree (3, 3) (ARMA(3, 3)) | Fit the ARMA(3, 3) model via formula: y(t) = c + φ1y(t − 1) + φ2y(t − 2) + φ2y(t − 3) + θ1εε(t − 1) + θ2ε(t − 2) + θ3ε(t − 3) | 7 |
| Piecewise Mean (4 Pieces) | Split the time series into 4 pieces and compute mean of each piece | 4 |
| Piecewise Mean (8 Pieces) | Split the time series into 8 pieces and compute mean of each piece | 8 |
| Piecewise 2nd Moment (8 Pieces) | sum[$x^2$ * f(i)] of each piece | 8 |
| Piecewise Mean of 1st Diffirential (8 Pieces) | mean of 1st differential of each piece | 8 |

Table 3 below depicts examples of frequency domain transformations 104c. Other frequency domain transformations can also be used.

TABLE 3

| Transformation Name | Description/Formula | Number of Variables |
|---|---|---|
| Fast Fourier Transformation | Fast Fourier transformation for 32 points of data | 32 |
| Discrete Cosine Transform | Discrete cosine transform for 32 points of data | 32 |
| Wavelet Packet Transformation | Energy and entropy values of 16 packets obtained by Wavelet Packet Transformation. | 32 |
| Power Spectral Density | Power spectral density for 32 levels of frequency | 32 |

Table 4 below depicts examples of shape domain transformations 104d. Other shape domain transformations can also be used.

TABLE 4

| Transformation Name | Description/Formula | Number of Variables |
|---|---|---|
| Shapelet Transformation | Fit 4 waveform shape patterns that can distinguish data instances with at least a threshold level of detail. The transformed variables are the differences between the shapes and the data instances. | 4 |
| Square Waveform Matching | Fit the best square waveform to match each data instance. The transformed variables are the parameters of the best fit square waveform for each data instance. | 4 |
| Triangle Waveform Matching | Fit the best triangle waveform to match each data instance. The transformed variables are the parameters of the best fit triangle waveform for each data instance. | 4 |
| Sine Waveform Matching | Fit the best sine waveform to match each data instance. The transformed variables are the parameters of the best fit sine waveform for each data instance. | 4 |

Various combinations, substitutions, modifications, and/or additions to the transformations described in Tables 1-4 can be made and used as the transformations 104 that are applied to the data records 102 to generate the variable matrix 106. By using a comprehensive collection of transformations to create a large set of variables, data models can be generated by the system 100 without domain knowledge for the data records 102 based on the sheer number of variables and combinations of variables that are being considered. For instance, applying each of the example transformations described in Tables 1-4 can result in 209 variables.

In instances where domain knowledge regarding the data records 102 is available, one or more weighting schemes can be applied to appropriate variables in the variable matrix 106. For example, variables that are likely to provide accurate modeling of the data records 102, based on the domain knowledge, can receive a greater weight. Without domain knowledge, weighting may not be applied to the variables in the matrix 106.

Referring back to FIG. 1, horizontal data parallelization 108 can be applied to the variable matrix 106 to generate horizontally parallelized variable data 110. Horizontal data parallelization can involve partitioning the matrix 106 along its horizontal axis of data instances into a plurality of subsets. The partitioning of the matrix 106 can be performed in any of a variety of ways, such as through random redundant sampling in which the data instances are randomly permutated (reordered) and then subsets are generated with some or all data instances appearing redundantly across multiple subsets. Such random redundant sampling can reduce the risk of producing and using biased data to generate data models, which can improve the robustness of the modelling that the system 100 performs. For instance, biased datasets can cause any of a variety of problems in data models, such as overfitting of the data model to the specific data set that is used to generate the data model. Random redundant sampling can also reduce bias that may be introduced into the data from variables that have unbalanced distributions.

Figure 2B:
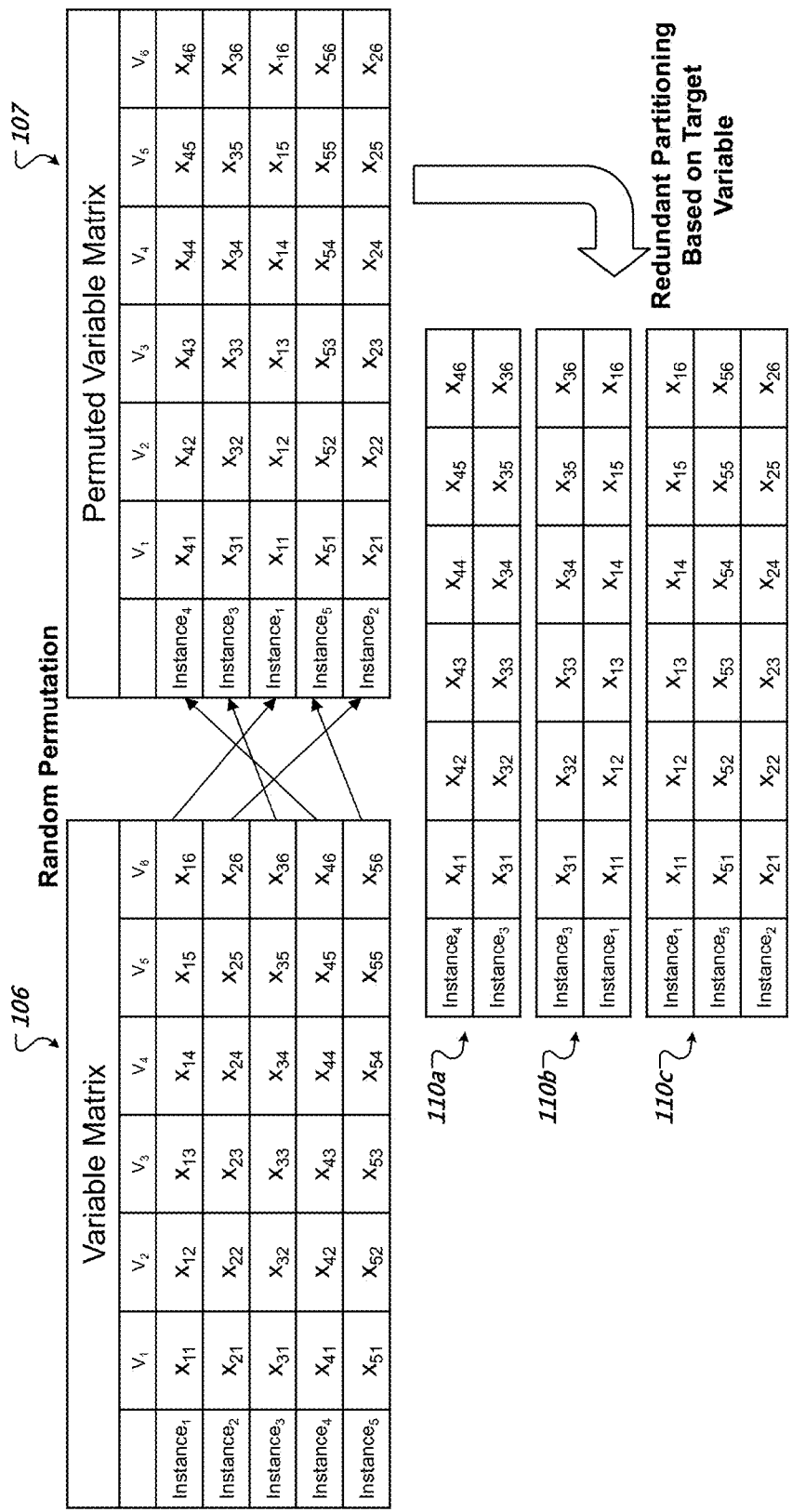

Referring to FIG. 2B, an example of random redundant sampling is depicted for horizontally partitioning the example variable matrix 106 into example horizontally parallelized variable data subsets 110*a-c*. In this simplified example, the variable matrix 106, which includes data values $x_{11}$-$x_{56}$ for $\text{instance}_1$-$\text{instance}_5$ across variables $V_1$-$V_6$, is randomly permutated to generate a permuted variable matrix 107 in which the rows of $\text{instance}_1$-$\text{instance}_5$ are randomly reordered. The permuted variable matrix 107 can be redundantly partitioned so that some of the data instances are included redundantly across multiple ones of the horizontal data subsets 110*a-c*. This can be performed in any of a variety of appropriate ways, such as in this instance where instances at partition lines are included in both of the neighboring data sets. For example, the data $\text{instance}_3$ falls at the partition between the first data subset 110*a* and the second data subset 110*b*, and is included in both of these subsets 110*a* and 110*b*. Horizontal data subsets 110*a-c* can each include any of a number of data instances (e.g., 2, 3, 10, 50, 100) and may be uniform and/or vary in size. Some or all of the data instances may be included in multiple data subsets 110*a-c* (e.g., included in 2 subsets, 3 subsets, 5 subsets, 10 subsets), and the redundancy of data instances may or may not be uniform across the instances in the variable matrix 106.

Any of a variety of other techniques can be performed to generate horizontally parallelized variable data 110, such as randomly assigning instances from the variable matrix 106 to horizontal data subsets in the horizontally parallelized variable data 110. Other techniques for generating the horizontally parallelized variable data 110 are also possible.

As discussed above, time series information from the original data 102 that is input into the system 100 can be preserved through the variable transformations 104 that are performed and included in the variable matrix 106. For example, frequency domain transformations can provide time series data that is included in each of the instances of the matrix 106. This data is preserved in the horizontally parallelized variable data 110 even though the instances are randomly reordered and redundantly grouped into partitions.

Referring to FIG. 1 again, vertical data parallelization 112 can be performed on the horizontally parallelized variable data 110 to generate vertically parallelized variable data 114. The vertical data parallelization 112 is performed by partitioning the data sets in the horizontally parallelized variable data 110 along the vertical axis of variables so that each horizontal instance is partitioned into a plurality of data instances. Like horizontal parallelization, vertical data parallelization can include both randomly and redundantly grouping data instances into subsets. Any of a variety of appropriate techniques can be performed to randomly and redundantly group the horizontal variable data 110, such as random sequential sampling, which includes randomly selecting one or more variables and then identifying a sequence of other variables that are closely associated with the selected variables. For example, a close association between variables can include variables that are generated based on (dependent on) information from other variables. Other close associations between variables are also possible. By randomly selecting variables and identifying sequences of other related variables, randomness and redundancy in the vertical parallelized variable data 116 can be obtained, similar to with the horizontal parallelized variable data 110.

The horizontal data parallelization 108 and the vertical data parallelization 112 can be performed to partition the variable matrix 106 into smaller data sets (computation packages) so that each data set can be readily processed by a computational unit, such as a cloud node in a cloud computing system. For example, by partitioning the data along the horizontal axis and then along the vertical axis of the variable matrix 106, the data can be subdivided so as to reduce both the number of instances and the number of variables that are included in each computation package. This can allow for computational units with lower technical specifications (e.g., memory, processing speed, currently available processing and storage capacity) to be used for each of the computational packages, which can make generating data models efficient and practical in distributed computing environments where there may be a large number of computational resources, few of which may have top of the line specs.

Figure 2C:
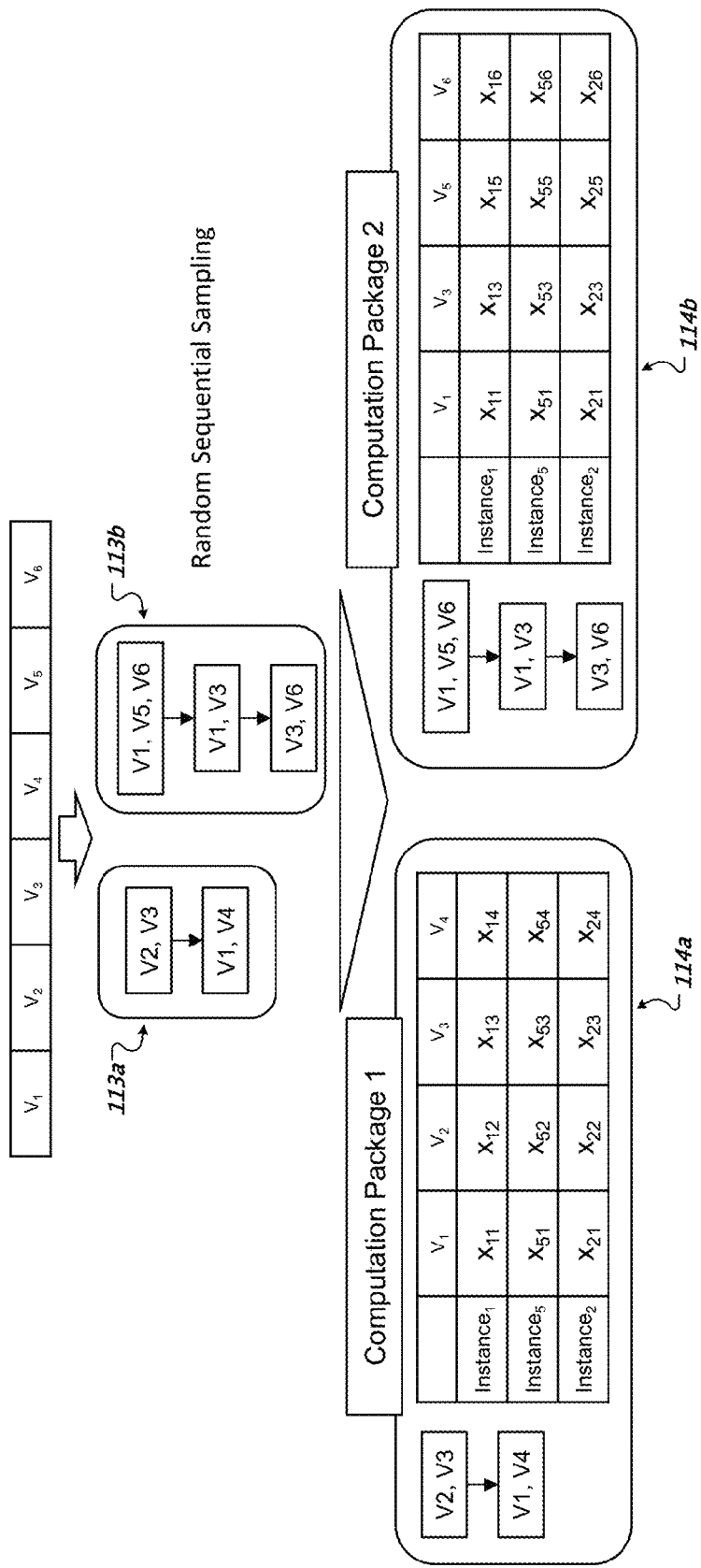

Referring to FIG. 2C, an example of random redundant sampling is depicted for vertically partitioning one of the example resulting horizontal data subsets 110*a-c* that are depicted in FIG. 2B. In the depicted example, the data subset 110*c* is depicted as being vertically partitioned. The same vertical partitioning can also be performed on the other horizontal data subsets 110*a-b* (as well as other horizontal data subsets resulting from the variable matrix 106 that are not depicted). In the depicted example, the variables $V_1$-$V_6$ are partitioned into variable example groups 113*a-b* through random sequential variable sampling. For instance, in the example group 113*a*, the variables $V_2$ and $V_3$ are randomly selected, and then the variables $V_1$ and $V_4$ are identified based on one or more of the randomly selected variables $V_2$ and $V_3$. (e.g., the variables $V_2$ and/or $V_3$ are generated based on variables $V_1$ and $V_4$). Similarly, in the example group 113*b*, the variables $V_1$, $V_5$, and $V_6$ are randomly selected, then a first level of other variables $V_1$ and $V_3$ are identified based on one or more of the randomly selected variables $V_1$, $V_5$, and $V_6$ (e.g., the variables $V_1$, $V_5$, and/or $V_6$ are generated based on variables $V_1$ and $V_3$), and then a second level of other variables $V_3$ and $V_6$ are identified based on the first level of other variables $V_1$ and $V_3$ (e.g., the variables $V_1$ and/or $V_3$ are generated based on the variables $V_3$ and $V_6$).

The groups 113*a-b* include the variables included within each group, regardless of the level at which they are included (whether a randomly selected variable or a sequential variable identified through a dependency). Through the random and sequential partitioning of the variables, redundancy in the variable groups can be created. For example, the variables $V_1$ and $V_3$ appear in both the group 113*a* and the group 113*b*. In instances where the variables are weighted, such as when there is domain knowledge regarding the data 102, the weighting can be used to select the variables for the groups 113*a-b*. For example, the random selection of a variable for a group can include weightings so that more greatly weighted variables (more significant variables) are likely to be selected. In some instances, weighting can make the distribution of more significant variables into different groups more likely. In some instances, weighting can make the likelihood that more significant variables will be grouped together in the same groups more likely.

The example horizontal data subset 110c is then further divided based on the groups 113a-b to create the computational packages 114a-b (horizontally and vertically partitioned dataset). For example, the computational package 114a includes the data values for variables $V_{1-4}$ across the data instances from subset 110c (instance$_1$, instance$_2$, and instance$_5$) and the computational package 114b includes the data values $V_1$, $V_3$, $V_5$, and $V_6$ for the same data instances from subset 110c. Each of the computational packages 114a-b can be provided to a computational unit for processing as described below with regard to FIGS. 2D-F.

Referring back to FIG. 1, the computational packages that are included in the vertically parallelized variable data 114 can be provided to computational units for tree-based variable evaluation 116 to generate regression/classification decision trees 118 that can be used to determine scores for variables. Scores can indicate levels of importance and/or accuracy of variables in appropriately modeling the data 102. The tree-based variable evaluation 116 can involve randomly generating trees for each of the computational packages, individually removing variables from the trees, and evaluating the effect that removing the variable has on the results generated by the tree. A variable that creates significantly worse results when it is removed can be determined to be more important and significant in modeling the data 102. The tree-based variable evaluation 116 can also and/or alternatively include determining correlations between each variable and a target variable. Other determinations can also be made as part of the tree-based evaluation 116. Scores for variables can be determined based, at least in part, on the level of importance/significance of a variable and/or on the correlation of the variable to a target variable. A single target variable can be used to provide simplicity without losing generality. If multiple target variable are used, they can be combined into a tuple variable, such as x=(x1, x2, . . . ), which can result in greater complexity.

Figure 2D:
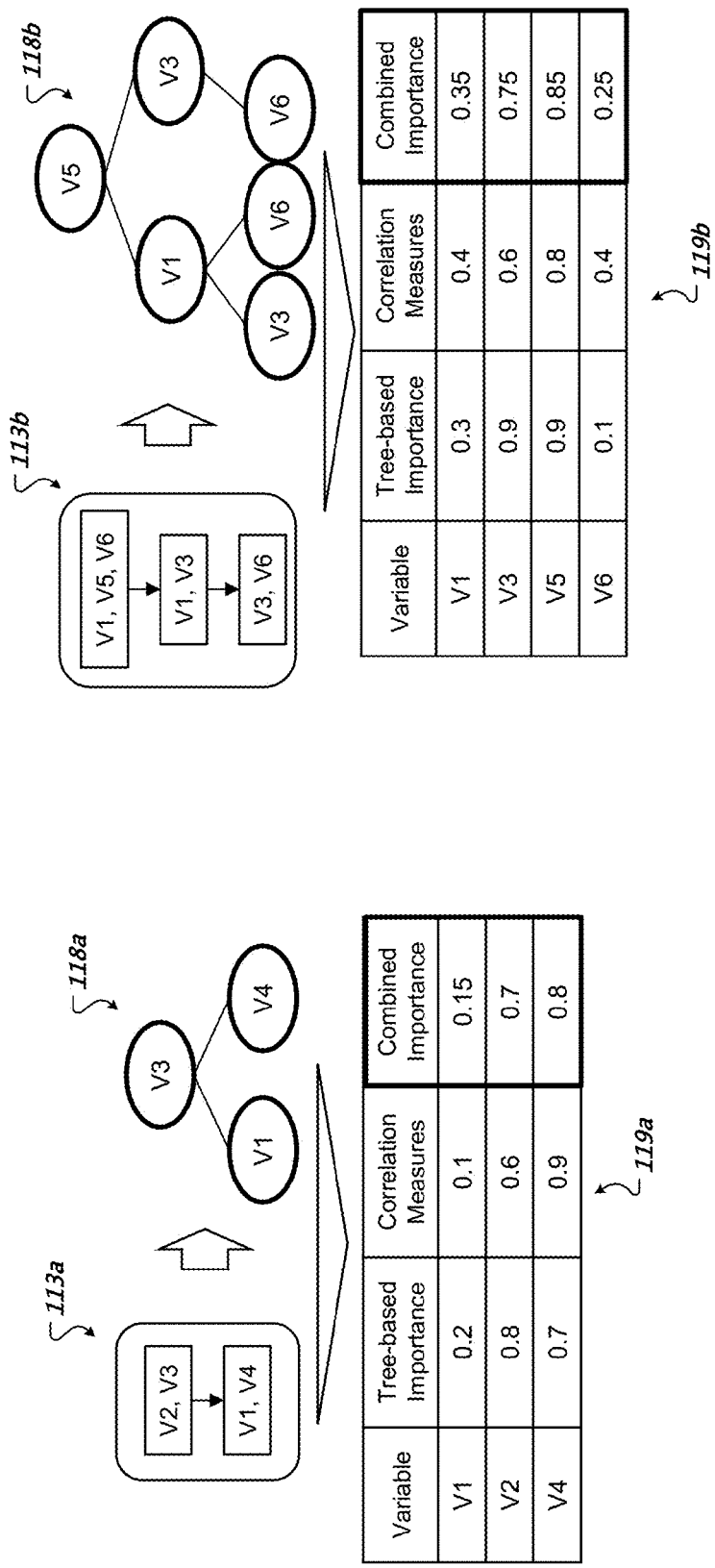

Referring to FIG. 2D, example trees 118a-b are depicted as being generated from the variable groups 113a-b for the computational packages 114a-b. The example trees 118a-b can be used to determine scores that are represented in the tables 119a-b, which in this example are tree-based importance scores, correlation measures, and combined importance scores which combine the tree-based importance scores and the correlation measures. The trees 118a-b can be generated randomly from the groups 113a-b. For example, at each node of the trees 118a-b a variable can be randomly selected. The importance scores can be generated based on each variable's level of influence on the trees 118a-b, which can be done by, for example, removing and/or replacing the data of the variable (data from the corresponding computational packages 114a-b) under evaluation with noise data and then checking the change it caused, such as the accuracy loss that was caused. A greater level of accuracy loss can indicate a greater level of importance for the variable, and thus a greater importance score. Statistical correlation measurements can be determined in any of a variety of appropriate ways, such as using a chi-squared test (for discrete variables) and/or a correlation ratio (for continuous variables). The importance scores and correlation measures can be combined to create the combined importance scores, as depicted in tables 119a-b.

The example trees 118a-b are illustrative of random trees that can be generated for evaluation. In some implementations, one or more variables from the groups 113-ab may be excluded from the trees 118a-b, as indicated by variable $V_3$ being excluded from the example tree 118a. In some implementations, each variable from the groups 113a-b is included in each of the trees 118a-b. Nodes in the trees 118a-b corresponding to particular variables that are being evaluated may be removed and/or substituted when they are under evaluation to determine the effect of the corresponding variable being evaluated, which can be represented by the node not being present in the trees 118a-b. Example scores are depicted in the tables 119a-b with normalized values between 0.0 and 1.0. Other ranges of scores are also possible, including heterogeneous score ranges. The tables depict a simplistic example is depicted in which the combined importance score is the average of the importance score and the correlation measures for each of the variables. Other combinations can also be used.

Example techniques for determining the importance scores and the correlation values are described below. In one example, the importance score $S_i$ of each variable $x_i$ can be calculated by checking the accuracy loss of the grown tree after removing the node in the tree corresponding to $x_i$. The correlation value $C_i$ of each transformed variable $x_i$ with respect to the target variable y can be determined based on, for example, the characteristics of $x_i$ and y. For example, a Pearson correlation coefficient can be used if both $x_i$ and y are quantitative, a correlation ratio can be used if one is quantitative and the other is qualitative, and multiplicative inverse of Chi-squared test p-value can be used if both are qualitative.

The combined importance score can be determined in any of a variety of appropriate ways. For example, the combined importance value $P_i$ can be calculated via the formula below. In some instance, it may be inaccurate to compare the combined importance scores of the variables that use different correlation measurements, if the coefficient a is not set to zero.

$$P_i = a^*C_i + (1-a)^*S_i, \quad 0 \le a \le 1$$

Meta-information can also be generated in association with the information contained in the tables 119a-b, such as the dataset size that was used to determine the scores, the number of variables in each tree 118a-b, and/or other relevant factors with regard to the determined scores.

Referring to FIG. 1, the scores determined using the trees 118 can be aggregated and evaluated 120 to generate aggregated variable importance scores 122. For example, the scores that are determined by the computational units can be received at a centralized system that merges and aggregates the scores together, and the evaluates the combined scores to make determinations regarding, for example, variables that will be included in the data models (e.g., variables that appear to model the data 102 accurately) and other variables that will be excluded (e.g., variables that do not appear to model the data 102 accurately). Any of a variety of appropriate techniques can be used to aggregate and merge scores together, such as using statistical techniques like mean, median, average rate to error calculations, and/or other appropriate metrics. Additionally and/or alternatively, distribution meta-information can be used to evaluate the significance of each of the scores that are being combined. For example, scores may be weighted by the size of the dataset that generated each score (e.g., scores generated from larger datasets receiving greater weighting) and then combined. The evaluation 120 can additionally include discarding variables that do not have at least a threshold level of significance (e.g., based on hypothesis tests, based on raw score, based on comparative scores with other variables) with regard to the data 102.

Figure 2E:
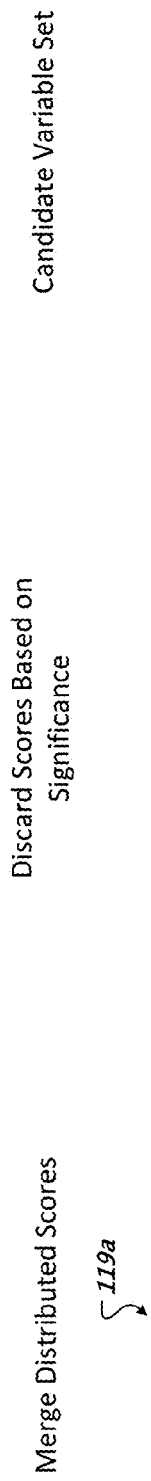

Referring to FIG. 2E, the tables 119a-b are received from the computational units (node), for example, by a receiving unit (node) in a distributed computing environment and are merged together, as indicated by table 121 which provides an aggregated score list. In this example, the scores for $V_1$ are the only overlapping scores from the tables 119a-b that are combined. As mentioned above, these scores can be combined in any of a number of ways. A simple example of averaging the values is depicted in the table 121. Other ways to combine the values are also possible. In addition to combining scores, the meta-information can also be included in the table 121 and combined. Once the scores and other meta-information have been aggregated into the table 121, statistical tests (e.g., t-hypothesis tests) can be performed using this information to determine the significance levels of the scores. Variables that are determined to be non-significant are discarded, as indicated by variables $V_1$ and $V_6$ being struck through. Statistical hypothesis tests can be performed so that the risk of selecting false important variables is reduced. The resulting lists of variables that have at least a threshold level of significance with regard to the data 102 that is under evaluation are included in the aggregated variable importance scores 122.

Referring to FIG. 1 again, the aggregated variable importance scores 122 can be used to generate and/or fine-tune models 124, which can result in usable data models 126. For example, the set of variables that are used for data model training can further be pruned to just a subset of the variables having the highest rankings (e.g., top 0.1% of variables, top 1% of variables, top 5% of variables) and can be fed into one or more modelling algorithms. In some implementations, multiple modelling algorithms can be run using the top ranked variables and can result in multiple candidate data models, which can be evaluated against each other to identify a best data model.

Figure 2F:
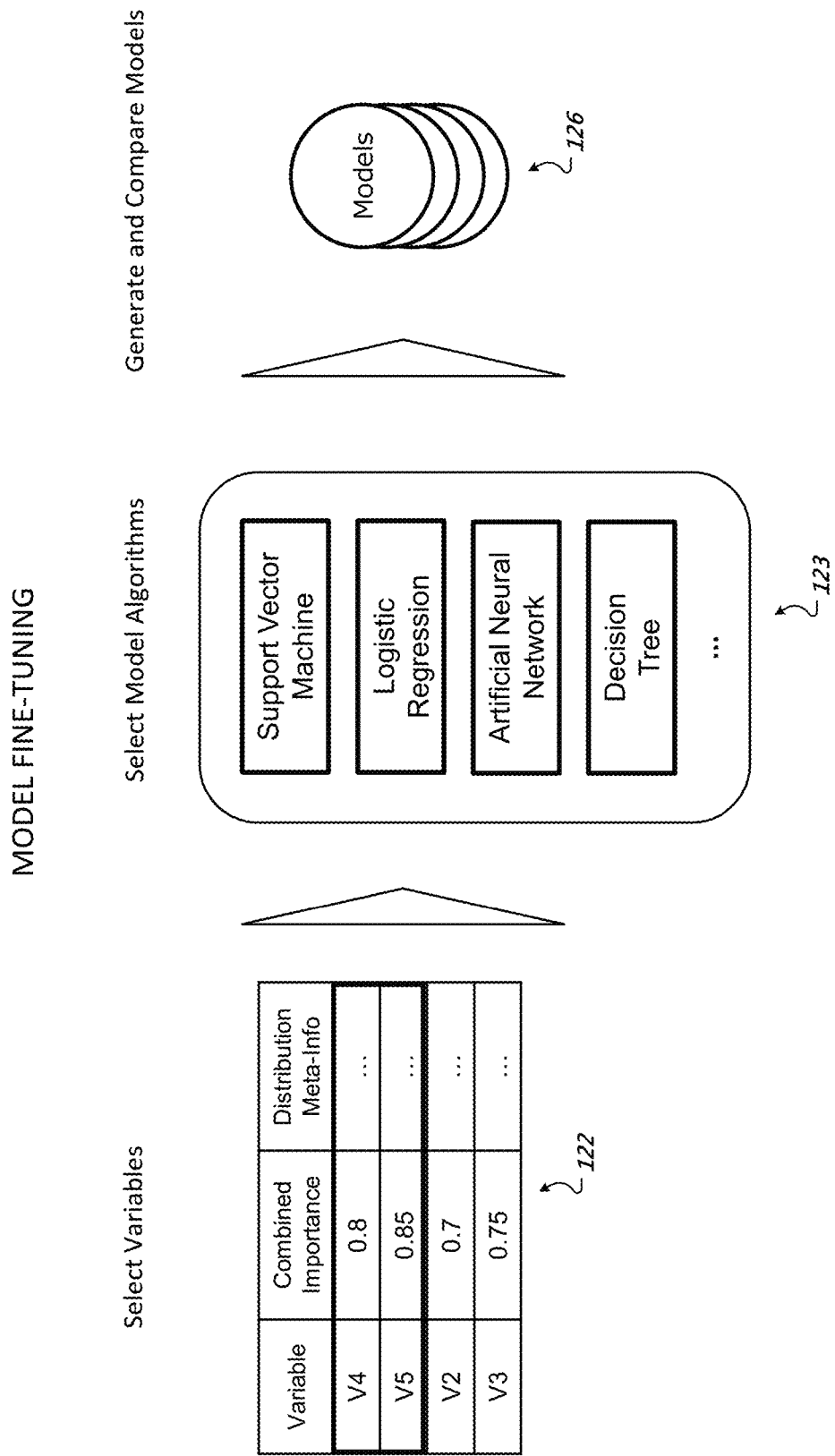

Referring to FIG. 2F, an example of generating models 124 from the significant variables 122 is depicted. For example, the top variables $V_4$ and $V_5$ are selected from the set of significant variables 122 and are fed into multiple different modelling algorithms 123, which in this example includes support vector machines, logistic regressions, artificial neural networks, and decision trees. Other modeling algorithms can also be used. Each of these modeling algorithms 123 can produce one or more candidate data models 124, which can be compared against each other and/or against historical/previous data models to identify a best data model to use going forward. For example, the techniques described with regard to the example system 100 in FIGS. 1-2 can be periodically performed to determine whether systems (e.g., engines, medical patient health, financial systems, business performance) new data models would better represent the systems, for instance, which may have changed over time. The best model from among the candidate models 124 can be identified, and it can be compared against the historically best model to make such a determination.

The system 100 can be used in any of a variety of different contexts, including situations in which there is no or little domain knowledge. For example, the system 100 can be used to generate data models to diagnose problems with engines and to prospectively recommend users take various actions to avoid such problems in the future based on available engine data (e.g., engine sensor data). In another example, the system 100 can be used to in the healthcare industry to generate data models to diagnose patient health conditions based on available health information for users (e.g., medical history, fitness tracker data, vital sign data). In a further example, the system 100 can be used to generate data models to predict revenues for a business based on data for the business (e.g., sales, inventory, prices). Other uses are also possible.

Figure 3:
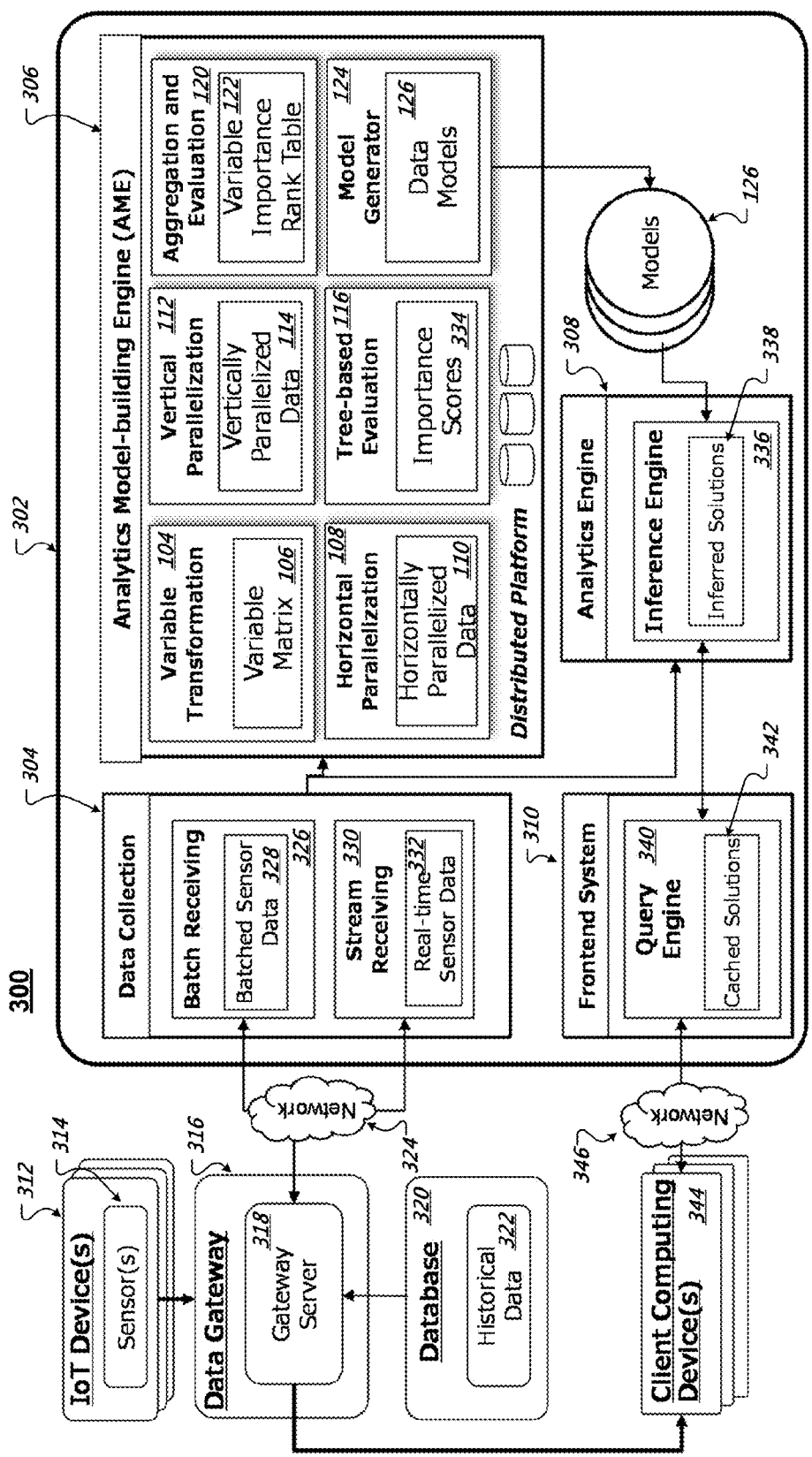
FIG. 3 is a diagram of an example system for generating data models from data generated by or more data sources.

FIG. 3 is a diagram of an example system 300 for generating data models from data generated by or more data sources. The example system 300 can be similar to and perform similar operations as those described above regarding the system 100 depicted in FIGS. 1-2.

The example system 300 includes a computer system 302 that is programmed to receive data (e.g., time series data) from various data sources (e.g., IoT devices), generate data models, and then provide user-accessible features that use the generated data models (e.g., providing diagnostic services to user queries regarding various problems). The computer system 302 can include one or more computing devices (e.g., servers, personal computing devices) that, actually and/or virtually, can provide a distributed computing platform on which the system 300 can operate. For example, the computer system 302 can be a cloud computing system that uses a networked collection of computing devices that allow for computational units, which may be virtual computing devices that are operating across the collection of computing devices, to be deployed and scaled as needed. Other configurations are also possible.

The example computer system 302 includes a data collection subsystem 304 that is programmed to obtain and collect data from data sources that are external to the computer system 302, such as from IoT devices that transmit data over the internet and/or other networks. The data collection subsystem 304 includes a batch receiving unit 326 to receive data in bulk, such as batched sensor data 328, and a stream receiving unit 330 to receive data in real time (or substantially real time), such as real-time sensor data 332.

The computer system 302 also includes an analytics model-building engine (AME) 306 that is programmed to receive data obtained by the data collection subsystem 304 and to implement the system 100 described above with regard to FIGS. 1-2. For instance, the AME 306 includes the variable transformation unit 104, the horizontal parallelization unit 108, the vertical parallelization unit 112, the tree-based evaluation unit 116, the aggregation and evaluation unit 120, and the model generator unit 122, which are each programmed to perform the respective operations described above. The AME 306 can be provide on a distributed computing platform (e.g., cloud based computer system) that can include one or more central processes that control the deployment of computational units and other computing resources within the distributed platform, such as to process each of the computational packages generated by the vertical parallelization unit 112.

The AME 306 can generate the data models 126 from the data that is obtained by the data collection subsystem 304, which can be provided to an analytics engine 308 that is programmed to use the data models 126 to analyze data. The analytics engine 308 includes an inference engine 336 that is programmed to generate inferred solutions 338 for given sets of data based on the data models 126 developed by the AME 306. For example, the AME 306 can receive engine data from sensors located in engines through the data collection subsystem 304, can generate the data models 126 based on the received data to model performance of the engines without specific domain knowledge about the engine space, and can provide them to the analytics engine 308, which can use the data models 126 to infer solutions to problems that engines are experiencing and/or to infer maintenance that should be performed to prevent engine problems that appear likely in the near future.

The analytics engine 308 can receive data to which the data models 126 are being applied from the data collection subsystem 304 and/or from a frontend system 310 through which users can submit queries that are analyzed by the analytics engine 308. For example, the analytics engine 308 may run a background process that continuously evaluates data that is received through the data collection subsystem 304 and, when an issue is identified that needs to be addressed, can provide an alert to one or more appropriate entities (e.g., devices, user accounts) regarding the problem and inferred solution. In another example, the analytics engine 308 can process specific queries that are received through the frontend system 310 on a demand basis (e.g., as queries are received from users).

The frontend system 310 can include a query engine 340 that is programmed to receive queries, process queries (e.g., textual analysis of queries, interaction with the analytics engine 308 as needed), and to provide results to client computing devices 344 that have submitted the queries over one or more networks 346 (e.g., the internet, LANs, WANs, wireless networks, VPNs, combinations thereof). The query engine 340 can maintain a cache 342 of solutions previously identified by the analytics engine 308, which it can reference first when a query is received. If an appropriate solution to the query is included in the cache 342, then it can be returned to the client computing device 344 without communicating with and requesting evaluation of the query by the analytics engine 308. If an appropriate solution is not included in the cache 342, then the query engine 308 can request the analytics engine 308 determine and provide a solution, which can be served to the client computing device 344 and can also be added to the cache 342. Use of the cache 342 can improve the efficiency of the computer system 302 by avoiding duplicative operations from being performed by the analytics engine 308, which may be resource (e.g., CPU cycles, RAM usage) intensive operations.

The client computing devices 344 can be any of a variety of appropriate computing devices, such as laptops, desktop computers, mobile computing devices (e.g., smartphones, tablet computing devices, wearable computing devices), embedded computing devices (e.g., diagnostic devices), and/or other appropriate computing devices. The client computing devices 344 can receive data, similar to the data that is being provided to the data collection subsystem 304, through a data gateway 316 that can include a gateway server 318 through which the data can be routed to appropriate ones of the client computing devices 344 and/or to the data collection subsystem 304. The data can be generated by various data sources, such as IoT devices 312, such as sensors 314. The data gateway 316 can also allow for information stored in a database 320, such as historical data 322 that may be stored and distributed in batches, to be communicated to the data collection subsystem 304 and/or the client computing devices 344. The data gateway 316 can communicate with the data collection subsystem 304 over a network 324, which can be similar to, the same as, or different from the network 346.

Figure 4:
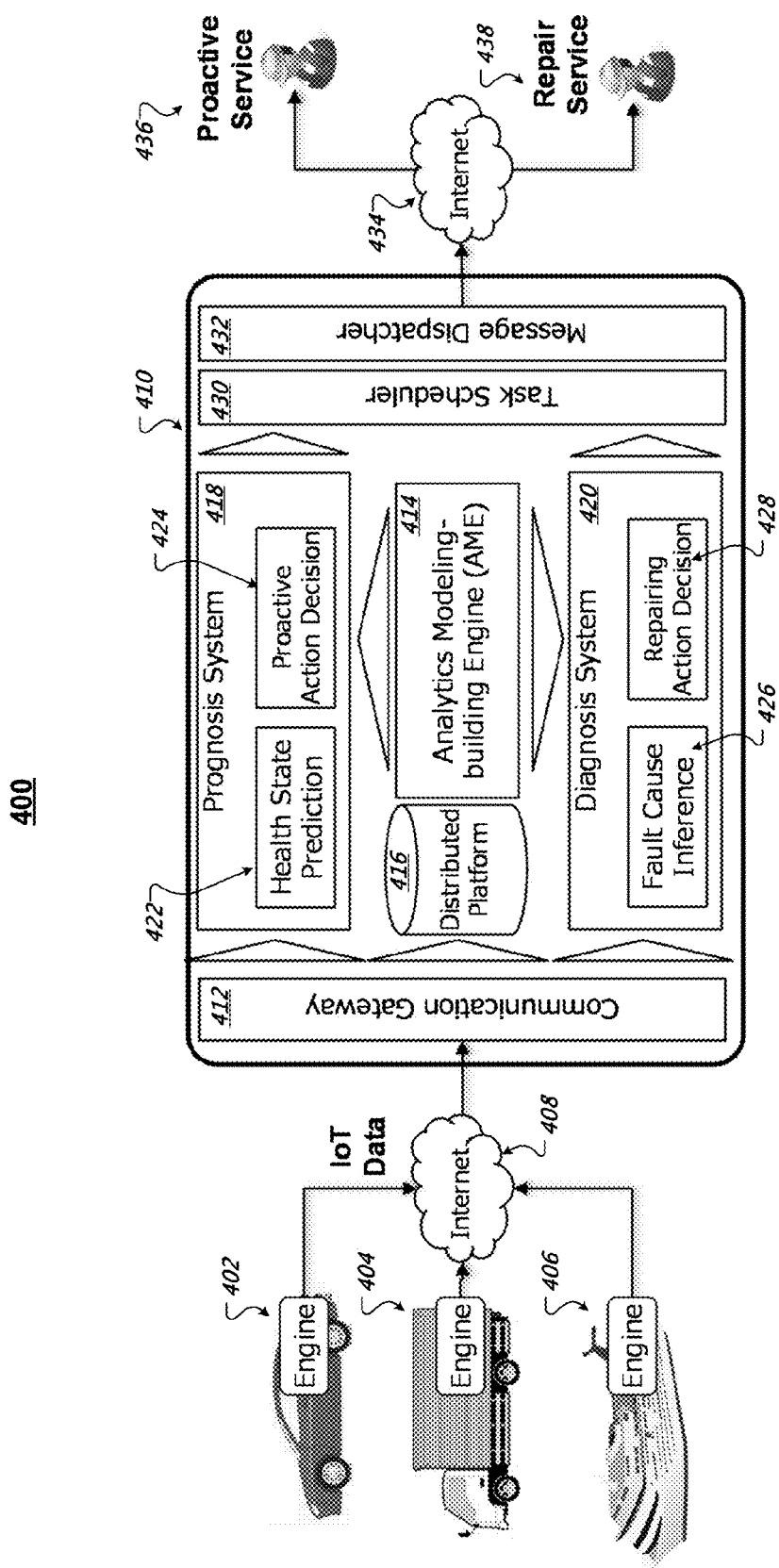
FIG. 4 is a diagram of an example system for generating and using data models to address engine issues.

FIG. 4 is a diagram of an example system 400 for generating and using data models to address engine issues. The system 400 is an example use case of the system 300 as applied to engines. The system 300 can be applied in any of a variety of other contexts, as well.

The system 400 includes vehicles 402-406 which each include one or more engines that provide IoT data over the internet 408 (example network) to a computer system 410 (similar to the computer system 302). Each of the engines in the vehicles 402-406 can include multiple different data sources (e.g., sensors, monitoring devices) that each provide time series data to the computer device 410 through the internet 408 (and/or other networks).

The computer system 410, which is similar to the computer system 302, includes a communications gateway 412 (similar to the data collection subsystem 304) that receives the data and distributes it to an AME 414 running on a distributed platform 416 (similar to the AME 306), to a prognosis system 418 (specific use case of the analytics engine 308 for proactively diagnosing and remedying issues that are likely to occur in engines in the future), and to a diagnosis system 420 (specific use case of the analytics engine 308 for reactively diagnose and remedy issues that have already occurred in engines). The AME 414 can generate data models based on the data from the vehicles 402-406, and can provide the models to the analytics systems 418-420, similar to the AME 306.

The prognosis system 418 includes a health state prediction engine 422 (similar to the inference engine 336) that is able to generate proactive action decisions 424 (similar to the inferred solutions 338). The diagnosis system 420 includes a fault cause inference engine 426 (similar to the inference engine 336) that is able to generate repairing action decisions 428 (similar to the inferred solutions 338). The decisions 424 and 428 can be provided to a task scheduler 430 that is programmed to schedule the determined actions/repairs and to a message dispatcher 432 to transmit information about the determined actions/repairs over the internet 434 (and/or another network) to computing devices and/or computer systems associated with an appropriate proactive service provider 436 and/or an appropriate repair service provider 438.

Figure 5:
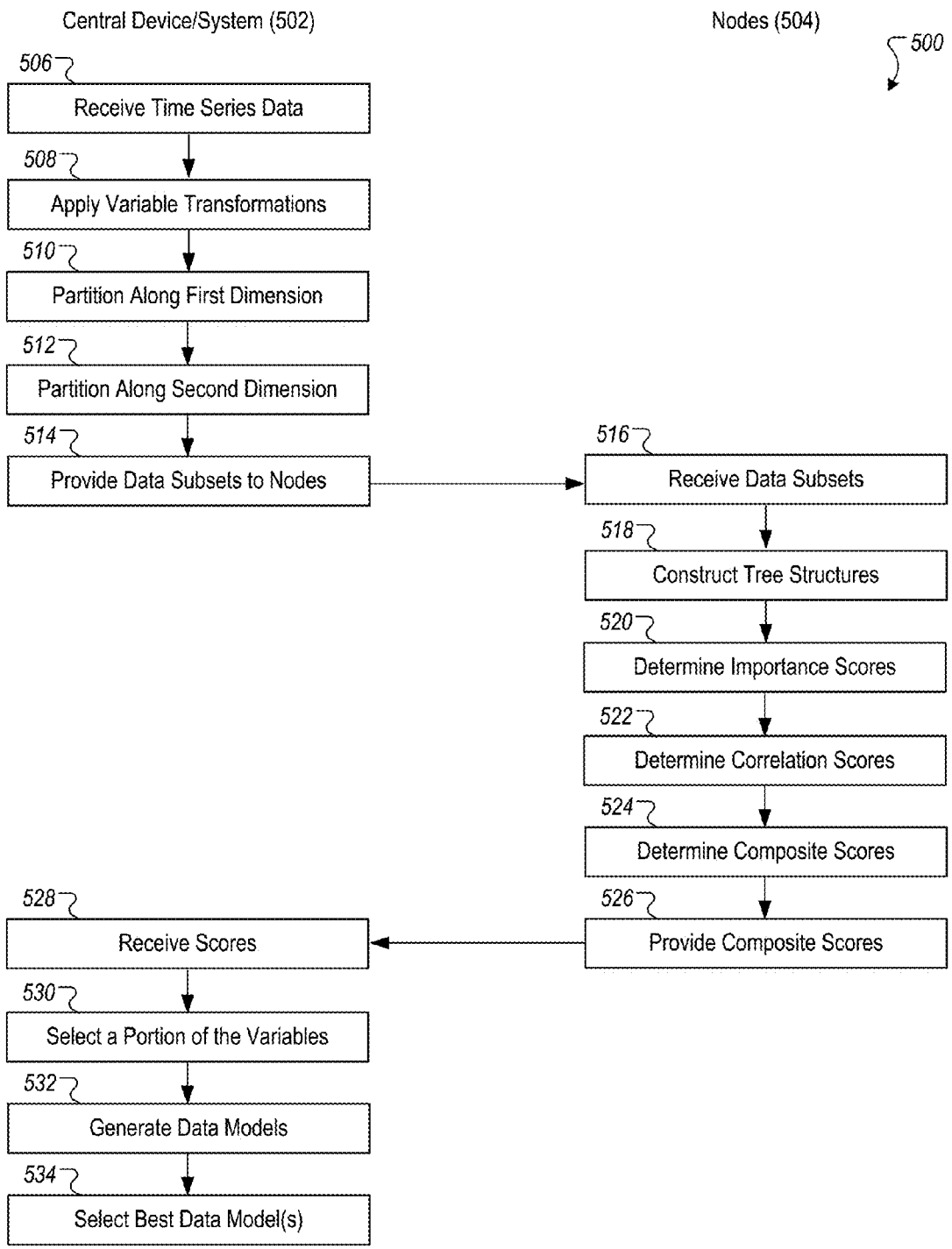
FIG. 5 is a flowchart of an example technique for generating data models for time series data.

FIG. 5 is a flowchart of an example technique 500 for generating data models for time series data. The example technique 500 is indicated as being performed in part by one or more central devices/systems 502 and also in part by a plurality of nodes 504. The central device/system 502 and the nodes 504 can be implemented as part of a distributed computing platform, such as a cloud computing system. For example, the technique 500, the central device/system 502, and the nodes 504 can be implemented by the analytics model-building engines 306 and/or 414, the systems 300 and/or 400 more generally, the system 100, and/or other appropriate computer systems.

The central device/system 502 can receive time series data (506) and can apply a plurality of variable transformations to the time series data (508). For example, as described above with regard to the variable transformation unit 104 in FIGS. 1, 2A, and 3, a plurality of variable transformations can be applied to time series data to generate the variable matrix 106. In some implementations, the plurality of variable transformations to the time series data (508) can be alternatively and/or additionally performed using a separate distributed system, such as using the nodes 504.

Such a variable matrix can first be partitioned along a first dimension of the matrix to generate data sets (510). For example, the horizontal parallelization unit 108 can horizontally partition the variable matrix 106 into a plurality of data sets in a random manner and with some redundancies, as described above with regard to FIGS. 1, 2B, and 3. In some implementations, the first partitioning of the variable matrix may be vertical partitioning (instead of horizontal partitioning) to generate data sets, as described with regard to the vertical parallelization unit 112 in FIGS. 1, 2C, and 3.

Next, the data sets can be portioning along a second dimension to generate data subset (512). For example, the vertical parallelization unit 112 can vertically partition the data sets from the horizontal parallelization unit 108 to generate data subsets, as described above with regard to FIGS. 1, 2C, and 3. In implementations in which the first partitioning is vertical partitioning, the partitioning along the second dimension can be horizontal partitioning as described above with regard to FIGS. 1, 2B, and 3.

The data subsets that are generated from the partitioning along the second dimension can be provided to the nodes 504 for evaluation (514). Each node can receive one or more of the data subsets (516), construct tree structures for the data subsets (518), and determine importance scores (520), correlation scores (522) and composite scores (524). For example, as described above with regard to FIGS. 1, 2D, and 3, the tree-based evaluation unit 116 can construct trees from the data subsets and determine importance, correlation, and composite scores for the variables as described above. Once the scores are generated, the nodes 504 can provide the scores back to the central device/system 502 (526).

The central device/system 502 can receive the scores (528) and, based on the scores, select a portion of the variables to use for generating models for the time series data (530). For example, the aggregation and evaluation unit 120 can aggregate scores from the nodes and select a portion of the variables that have the best scores and most accurately model the time series data, as described above with regard to FIGS. 1, 2E, and 3. Using the selected variables, candidate data models can be generated (532) and, from the generated data models, one or more best data models can be selected (534). For example, the model generator 124 can generate data models using the selected variables and a plurality of modeling algorithms, and can select one or more best models to use, as described above with regard to FIGS. 1, 2F, and 3.

Figure 6:
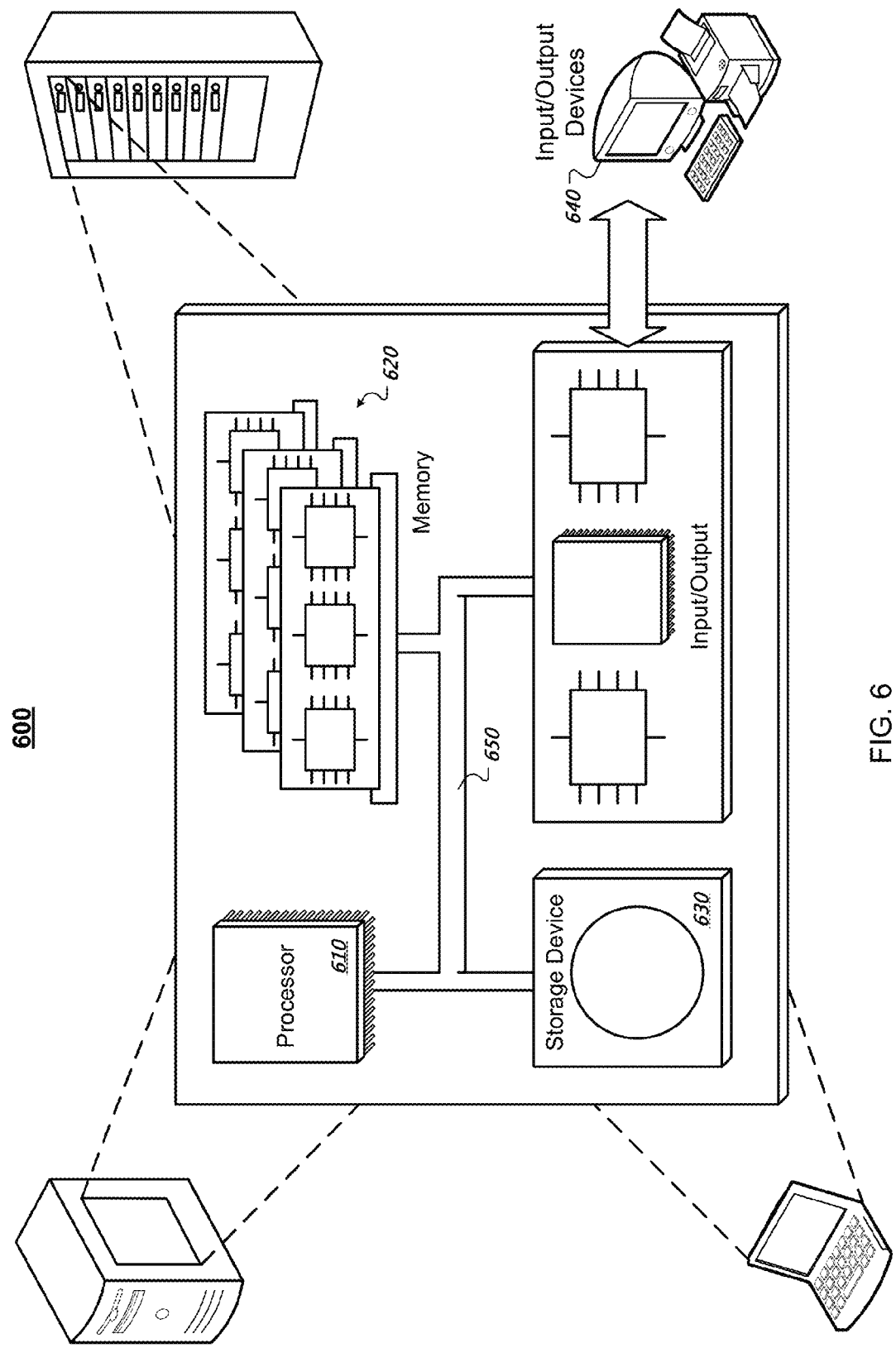
FIG. 6 illustrates a schematic diagram of an exemplary generic computer system.

FIG. 6 illustrates a schematic diagram of an exemplary generic computer system. The system 600 can be used for the operations described in association with the technique 500 according to some implementations, and may be included in the systems 100, 300, and/or 400.

The system 600 includes a processor 610, a memory 620, a storage device 630, and an input/output device 640. Each of the components 610, 620, 630, and 620 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method for generating computer-readable data models, the method comprising:
    receiving, at a computer system, time series data from a data source, wherein the time series data comprises a plurality of data records;
    applying, by the computer system, a plurality of variable transformations to the time series data to generate a variable matrix with a first dimension and a second dimension, wherein the first dimension includes a plurality of variables that correspond to the plurality of variable transformations, and the second dimension includes a plurality of data instances that correspond to the plurality of data records;
    partitioning, by the computer system, the variable matrix along a first one of the first and second dimensions to generate a plurality of data sets;
    partitioning, by the computer system, the plurality of data sets along a second one of the first and second dimensions to generate a plurality data subsets, wherein each of the plurality of data subsets includes multiple variables from the plurality of variables and multiple data instances from the plurality of data instances;
    providing, by the computer system, each of the plurality of data subsets to a respective computational unit in a distributed computing environment for evaluation of a level of importance for the multiple variables included in each of the plurality of data subsets based on the multiple data instances in each of the plurality of data subsets;
    receiving, at the computer system and from the respective computational units, scores for the plurality of variables as determined by the respective computational units from the plurality of data subsets; and
    selecting, by the computer system, a portion of the plurality of variables as having at least a threshold level of accuracy in modeling the time series data from the data source.

2. The computer-implemented method of claim 1, wherein:
    partitioning the variable matrix along the first one of the first and second dimensions comprises partitioning the variable matrix along the second dimension so that each of the plurality of data sets includes data values for a portion of the plurality of data instances across all of the plurality of variables, and
    partitioning the plurality of data sets along the second one of the first and second dimensions comprises partitioning the plurality of data sets along the first dimension so that each of the plurality of data subsets includes data values for a portion of the plurality of data instances across a portion of the plurality of variables.

3. The computer-implemented method of claim 2, wherein:

at least a portion of the plurality of data instances are redundant across the plurality of data sets and the plurality of data subsets, and at least a portion of the plurality of variables are redundant across the plurality of data sub sets.

4. The computer-implemented method of claim 3, wherein partitioning the variable matrix along the second dimension comprises:

randomly ordering the data instances and their corresponding data values in the variable matrix; and assigning groups of adjacent data instances into the plurality of data sets, with the groups of adjacent data instances overlapping each other.

5. The computer-implemented method of claim 3, wherein partitioning the plurality of data sets along the first dimension comprises:

randomly selecting groups of variables from the plurality of variables; and identifying, for each of the groups of variables, other variables upon which values for the selected groups of variables are, at least partially, based.

6. The computer-implemented method of claim 5, wherein:

the plurality of variables have associated weights that indicate how accurately they model the time series data, and the groups of variable are randomly selected based, at least partially, on the associated weights.

7. The computer-implemented method of claim 1, wherein each of the respective computational units is programmed to evaluate the level of importance for the multiple variables by:

determining importance scores for each of the multiple variables that are based on a change in accuracy in modeling the time series data between when each of the multiple variables are present in and absent from the plurality of data subsets;

determining correlation scores for each of the multiple variables that indicate levels of correlation with a target variable; and determining the scores for the plurality of variables based on combinations of the importance scores and the correlation scores.

8. The computer-implemented method of claim 7, wherein the importance scores are determined based on decision trees that are randomly constructed from each of the plurality of data subsets.

9. The computer-implemented method of claim 1, further comprising:

generating, using a plurality of modeling algorithms, a plurality of data models based, at least in part, on the selected portion of the plurality of variables;

comparing levels of accuracy for the plurality of data models in modeling the time series data from the data source; and selecting a best data model from among the plurality of data models based, at least in part, on the comparison of the levels of accuracy for the data models.

10. The computer-implemented method of claim 1, wherein the plurality of variable transformations include a plurality of statistical transformations.

11. The computer-implemented method of claim 1, wherein the plurality of variable transformations include a plurality of time domain transformations.

12. The computer-implemented method of claim 1, wherein the plurality of variable transformations include a plurality of frequency domain transformations.

13. The computer-implemented method of claim 1, wherein the plurality of variable transformations include a plurality of shape domain transformations.

14. The computer-implemented method of claim 1, wherein the data source comprises an internet of things (IoT) sensor and the time series data comprises IoT data generated by the IoT sensor.

15. The computer-implemented method of claim 1, wherein the portion of the plurality of variables are generated without domain knowledge related to the time series data or the data source.

16. The computer-implemented method of claim 1, wherein:

the distributed computing environment comprises a cloud computing system, and the respective computational units comprise nodes in the cloud computing system.

17. A computer system for generating data models, the system comprising:

at least one processor; and memory storing executable instructions that are executed by the at least one processor to cause the computer system to provide:

an interface that is programmed to receive time series data from a data source, wherein the time series data comprises a plurality of data records; and a model building engine that is programmed to:

apply a plurality of variable transformations to the time series data to generate a variable matrix with a first dimension and a second dimension, wherein the first dimension includes a plurality of variables that correspond to the plurality of variable transformations, and the second dimension includes a plurality of data instances that correspond to the plurality of data records, partition the variable matrix along a first one of the first and second dimensions to generate a plurality of data sets, partition the plurality of data sets along a second one of the first and second dimensions to generate a plurality data subsets, wherein each of the plurality of data subsets includes multiple variables from the plurality of variables and multiple data instances from the plurality of data instances, provide each of the plurality of data subsets to a respective computational unit in a distributed computing environment for evaluation of a level of importance for the multiple variables included in each of the plurality of data subsets based on the multiple data instances in each of the plurality of data subsets, receive, from the respective computational units, scores for the plurality of variables as determined by the computational units from the plurality of data subsets, and select a portion of the plurality of variables as having at least a threshold level of accuracy in modeling the time series data from the data source.

18. The computer system of claim 17, wherein:

partitioning the variable matrix along the first one of the first and second dimensions comprises partitioning the variable matrix along the second dimension so that each of the plurality of data sets includes data values for a portion of the plurality of data instances across all of the plurality of variables, and partitioning the plurality of data sets along the second one of the first and second dimensions comprises partitioning the plurality of data sets along the first dimension so that each of the plurality of data subsets includes data values for a portion of the plurality of data instances across a portion of the plurality of variables.

19. The computer system of claim 18, wherein:

at least a portion of the plurality of data instances are redundant across the plurality of data sets and the plurality of data subsets, and at least a portion of the plurality of variables are redundant across the plurality of data sub sets.

20. The computer system of claim 17, further comprising:

a cloud computing system comprising a plurality of nodes, wherein the respective computational units are the plurality of nodes and each of the plurality of nodes is programmed to evaluate the level of importance for the multiple variables by:

determine importance scores for each of the multiple variables that are based on a change in accuracy in modeling the time series data between when each of the multiple variables are present in and absent from the plurality of data subsets;

determine correlation scores for each of the multiple variables that indicate levels of correlation with a target variable; and determine the scores for the plurality of variables based on combinations of the importance scores and the correlation scores.

* * * * *

UNITED STATES PATENT AND TRADEMARK OFFICE
CERTIFICATE OF CORRECTION

PATENT NO. : 9,940,386 B2
APPLICATION NO. : 14/838653
DATED : April 10, 2018
INVENTOR(S) : Takuya Kudo et al.

Page 1 of 1

It is certified that error appears in the above-identified patent and that said Letters Patent is hereby corrected as shown below:

On the Title Page

Column 2, Item 57 (Abstract), Line 9, after "plurality" insert -- of --.

In the Claims

Column 20, Line 33, in Claim 1, after "plurality" insert -- of --.

Column 21, Line 5, in Claim 3, delete "sub sets." and insert -- subsets. --.

Signed and Sealed this
Thirtieth Day of April, 2019

Andrei Iancu
*Director of the United States Patent and Trademark Office*